United States Patent
Sikand et al.

(10) Patent No.: US 12,353,854 B2
(45) Date of Patent: Jul. 8, 2025

(54) COMPUTER CODE GENERATOR

(71) Applicant: Accenture Global Solutions Limited, Dublin (IE)

(72) Inventors: Samarth Sikand, Malviya Nagar (IN); Kapil Singi, Bangalore (IN); Kuntal Dey, Rampurhat (IN); Vikrant Kaulgud, Pune (IN); Vibhu Saujanya Sharma, Bangalore (IN); Adam Patten Burden, Tampa, FL (US); Ravi Kiran Velama, Bengaluru (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 117 days.

(21) Appl. No.: 18/365,326

(22) Filed: Aug. 4, 2023

(65) Prior Publication Data
US 2025/0045028 A1 Feb. 6, 2025

(51) Int. Cl.
G06F 8/35 (2018.01)
G06F 8/10 (2018.01)
G06F 40/40 (2020.01)

(52) U.S. Cl.
CPC .......... *G06F 8/35* (2013.01); *G06F 8/10* (2013.01); *G06F 40/40* (2020.01)

(58) Field of Classification Search
CPC ............ G06F 8/10; G06F 8/35; G06F 40/40
See application file for complete search history.

(56) References Cited

U.S. PATENT DOCUMENTS

| | | | |
|---|---|---|---|
| 2021/0081182 A1* | 3/2021 | Seshadri | G06F 8/73 |
| 2022/0269503 A1* | 8/2022 | Balasubramanian | G06F 8/73 |
| 2024/0020096 A1* | 1/2024 | Chen | G06F 40/30 |

FOREIGN PATENT DOCUMENTS

| | | | | |
|---|---|---|---|---|
| CN | 118151908 A | * | 6/2024 | G06F 8/33 |
| CN | 118696295 A | * | 9/2024 | G06F 11/3688 |
| WO | WO-2023014370 A1 | * | 2/2023 | G06F 8/30 |

* cited by examiner

*Primary Examiner* — Ziaul A Chowdhury
(74) *Attorney, Agent, or Firm* — Mannava & Kang, P.C.

(57) ABSTRACT

Disclosed herein is a system and method for generating computer code for a plurality of components of a software development project. An artificial intelligence code generator can generate computer code in response to a natural language text input describing a component of the software development project. A first database can store natural language text describing components of the software development project. A second database can store computer code generated at least partially by the artificial intelligence code generator and defining components of the software development project and corresponding to the natural language text stored in the first database. Using a pre-trained language model, the system can generate a natural language summary text based on the code intent of the first component, the identified characteristics of the objects, and the natural language text retrieved from the first database.

20 Claims, 15 Drawing Sheets

COMPUTER CODE GENERATOR

FIELD OF THE INVENTION

The present invention relates to a system and method for generating computer code for a software development project, and in particular for improving the code generated by an artificial intelligence code generator.

BACKGROUND OF THE INVENTION

Within complex and large software development projects, automated tools are used to generate code defining particular software components such as modules, data structures and other entities. Furthermore, machine learning and other artificial intelligence tools may be used to generate such code and these AI powered coding tools can generate code or assist in generating code in response to a natural language "prompt" from a human user. These AI powered coding tools may be trained on various sets of code relating to different software development projects and different computer languages.

The natural language prompts are usually provided by a human developer working on different components in the software development project and there can be many different teams of such developers. For a particular task, different software developers may take different approaches and so they may provide very different natural language prompts and styles of prompts, when working with an AI powered code generator. Whilst the AI code generator may provide code that me be functionally correct, inconsistencies can arise in the code due to the different styles, inconsistent prompt articulation, approaches and terminology used by different individual code developers. In certain cases, errors or defects can arise, which may only be detected at code integration stages when different software components are tested to ensure that they interact correctly. This can be difficult and take time to correct.

Human software developers may be trained in the best way to articulate a prompt to reduce such code issues from arising. Nevertheless, errors and inconsistencies can arise over time, especially in larger software development projects.

Additionally, slightly different software code may be provided from the AI code generator for the same input prompt as an AI model develops over time. Each time a natural language prompt is provided as an input to an AI code generator, different code may be expected even when the same AI model is used, because the behaviour of the AI code generator may be non-deterministic. This can also increase compatibility issues between different components of the software development project when the different components and modules are developed.

Therefore, there is required a method and system that overcomes these problems.

SUMMARY OF THE INVENTION

A software development project includes an artificial intelligence code generator that uses natural language prompts as inputs to provide outputs of computer code used to generate various components. As the project progresses, particular natural language prompts that are used and stored in a prompt database or other datastore. Similarly, the code output is also stored in a database, which may be the same or separate from the prompt database. The various prompts and output computer code fragments are associated with each other so that the database also stores which computer code output (either raw or following developer amendment) corresponds to which input prompt.

Materials, documentation, and other design requirements describe components of the software development project (SDP) and how they interact and work together. This material is provided to the system. For example, these design requirements may include sequence diagrams, state diagrams, flowcharts, unified modelling language documents, change request proposals, systems architecture documents and project management plans. This material may take different forms and may be stand-alone documents or integrated within one or more design repositories. These software design requirements are used to generate a dependency graph of components within the software development project. Therefore, the design requirements may be provided in a suitable format for extraction and generation of the dependency graph.

A particular component of the software development project may be considered. These components may be processed separately or as groups of components, for example. The component that is to be processed has not yet had any object or execution code generated. For example, the system may automatically determine which particular components are missing from the code database or the system may receive a prompt from a user, for example. A project plan or other management tool may be consulted to determine which components have not had their code generated.

The particular component that is selected (or next in a queue) will have a number of related dependent components. For example, a particular component may have neighbouring components in the dependency graph, either as siblings, inputs, and/or outputs. For example, a data object may have related data objects, input modules and/or downstream output components. A subset of components that have one or more dependencies related to this component is generated from the dependency graph of components. The extent and reach of the subset may be predetermined. For example, this may include one, two or more steps, nodes or degrees or separation within the dependency graph.

Attributes of the first or central component are used to generate a code intent. For example, the title or name of the code component under investigation may be used to extract a purpose (intent) of the component. Particular nomenclature or a naming convention may be used to define such titles and so extraction of the code intent may use lookup tables or other interpretation rules to extract the code intent. For example, a component name may include term "data object" and the type, source, and/or functionality may also be defined in the name or other attributes present within the originating design requirements.

Where code has already been generated for components in the determined subset of components having dependencies related to the central component, then these are retrieved from the code database along with the corresponding natural language text prompts that were used to generate these computer code fragments or portions. Characteristics of objects within the retrieved computer code for these dependent components are then identified. Again, this may use processing rules or other business logic to extract the characteristics (e.g., computer language rules may be consulted to determine the characteristics).

A pre-trained language model (e.g., an open source language model) is used to generate a natural language summary text based on the code intent of the central component and the identified characteristics of objects within related components. Furthermore, the pre-trained language model is also provided with the natural language text retrieved from the prompt database or associated and dependent components that have already been coded.

The output from the pre-trained language model of the natural language summary text is then used as a new prompt provided to the AI code generator, which is used to generate the software code for the central component. Therefore, inconsistencies and other areas can be reduced for the new code.

In some embodiments, the new code and the generated prompt are also stored within the appropriate databases for use in future code generation stages. Therefore, the process may improve as a SDP progresses.

In accordance with a first aspect there is provided a system for generating computer code for one or more components of a software development project, the system comprising:

an artificial intelligence code generator generating computer code in response to a natural language text input describing a component of the software development project;

a first database storing natural language text describing components of the software development project used with the artificial intelligence code generator;

a second database storing computer code generated at least partially by the artificial intelligence code generator and defining components of the software development project and corresponding to the natural language text stored in the first database; and one or more computers and one or more storage devices storing instructions that are operable, when executed by the one or more computers, to cause the one or more computers to execute the steps of:

receive design requirements of the software development project;

generate a dependency graph of components of the software development project based on the design requirements;

determine from the dependency graph a subset of components of the software development project having one or more dependencies related to a first component of the software development project;

determine from attributes of the first component a code intent;

retrieve from the first database natural language text describing one or more components of the software development project having one or more dependencies related to the first component that have been used to generate computer code stored in the second database using the artificial intelligence code generator;

retrieve from the second database computer code corresponding to the retrieved natural language text describing the one more components of the software development project having one or more dependencies related to the first component;

identify from the computer code retrieved from the second database characteristics of objects within the computer code;

using a pre-trained language model, generate for the first component a natural language summary text based on the code intent of the first component, the identified characteristics of the objects, and the natural language text retrieved from the first database;

provide the natural language summary text for the first component to the artificial intelligence code generator; and the artificial intelligence code generator generating computer code for the first component based on the provided natural language summary. Therefore, improved software code can be generated reducing errors and inconsistencies across a software development project. For example, the computer code may be software code in a high level computer language (e.g., C++, Java), object code, scripting code, a mark-up language, SQL, or any suitable format. This may be preconfigured so that the AI code generator can provide the appropriate output.

Optionally, the instructions may further cause the one or more computers to execute the step of:

before determining the subset of components of the software development project having one or more dependencies related to the first component, receiving information describing the first component of the plurality of components of the software development project, wherein the attributes of the first component are determined from the received information. The information may come from various sources and may be received automatically (e.g., using a data scraping tool).

Optionally, the received information may be a title of the first component. Other descriptive text may be used. In some embodiments, the title can be descriptive of the purpose of the first component. Natural language processing may be used to derive the information, for example. The attributes may also be determined from the design requirements that mention or include the first component.

In some embodiments, the instructions may further cause the one or more computers to execute the step of:

storing the computer code for the first component in the second database and the natural language summary text for the first component in the first database. Therefore, the system may improve over time with fewer inconsistencies in the AI generated software code as the software development project develops.

Optionally, the design requirements of the software development project may comprise any one or more of: high level design requirements, system architecture, project management path, and change request proposals. Other sources may be used.

According to a second aspect, there is provided a computer implemented method for generating computer code for one or more components of a software development project, the method comprising the steps of:

receiving design requirements of a software development project;

generating a dependency graph of components of the software development project based on the design requirements;

determining from the dependency graph a subset of components of the software development project having one or more dependencies related to a first component of the software development project;

determining from attributes of the first component a code intent;

retrieving from a first database storing natural language text describing components of the software development project used with an artificial intelligence code generator, natural language text describing one or more components of the software development project having one or more dependencies related to the first component that have been used to generate computer code stored in the second database using the artificial intelligence code generator;

retrieving from a second database storing computer code generated at least partially by the artificial intelligence code generator and defining components of the software development project and corresponding to the natural language text stored in the first database, computer code corresponding to the retrieved natural language text describing the one more components of the software development project having one or more dependencies related to the first component;

identifying from the computer code retrieved from the second database characteristics of objects within the computer code;

using a pre-trained language model, generating for the first component a natural language summary text based on the code intent of the first component, the identified characteristics of the objects, and the natural language text retrieved from the first database;

providing the natural language summary text for the first component to the artificial intelligence code generator; and generating computer code for the first component using the artificial intelligence code generator, based on the provided natural language summary.

Optionally, the method may further comprise the step of:

before determining the subset of components of the software development project having one or more dependencies related to the first component, receiving information describing the first component of the plurality of components of the software development project, wherein the attributes of the first component are determined from the received information.

Optionally, the information describing the first component of the plurality of components may received from a graphical user interface, GUI. However, the information may be received without user interaction as well.

In some embodiments, the received information may be a title of the first component.

In some embodiments, the method may further comprise the step of:

storing the computer code for the first component in the second database and the natural language summary text for the first component in the first database.

Optionally, the design requirements of the software development project may comprise any one or more of: high level design requirements, system architecture, project management path, and change request proposals.

Optionally, the step of determining a subset of components of the software development project having one or more dependencies related to a first component further comprises the step of flattening, tokenizing, and/or resolving direction dependencies between components in the subset of components within the dependency graph. Other techniques may be used to determine the subset of components.

Optionally, the method may further comprise the step of:

before providing the natural language summary text for the first component to the artificial intelligence code generator, splitting the natural language summary text into smaller natural language summary texts each below a predetermined length. The predetermined length may be static or dynamic. Having shorter prompts may improve the software or computer code generated by the AI software generator as it may have a lower likelihood of different parts of the prompts being misinterpreted.

Optionally, the step of generating for the first component a natural language summary text based on the code intent of the first component further may comprise iteratively aligning a rough natural language summary text with the characteristics of objects within the computer code by measuring a similarity between words in the rough natural language summary text and corresponding computer code until the measure of similarity is increased. The measure of similarity may be predetermined.

In accordance with a further aspect, there is provided a system comprising:

an artificial intelligence code generator that can generate computer code in response to a natural language text input describing a component of the software development project;

a first database that can store natural language text describing components of the software development project used with the artificial intelligence code generator;

a second database that can store computer code generated at least partially by the artificial intelligence code generator and defining components of the software development project and corresponding to the natural language text stored in the first database; and one or more computers and one or more storage devices storing instructions that are operable, when executed by the one or more computers, to cause the one or more computers to execute the steps of:

receive design requirements of the software development project;

generate a dependency graph of components of the software development project based on the design requirements;

determine from the dependency graph a subset of components of the software development project having one or more dependencies related to a first component of the software development project;

determine from attributes of the first component a code intent;

retrieve from the first database natural language text describing one or more components of the software development project having one or more dependencies related to the first component that have been used to generate computer code stored in the second database using the artificial intelligence code generator;

retrieve from the second database computer code corresponding to the retrieved natural language text describing the one more components of the software development project having one or more dependencies related to the first component;

identify from the computer code retrieved from the second database characteristics of objects within the computer code; and using a pre-trained language model, generate for the first component a natural language summary text based on the code intent of the first component, the identified characteristics of the objects, and the natural language text retrieved from the first database. The output may stop at the generation for the natural language summary text (prompt) and provided to a user or developer to assist them with their coding task.

In accordance with a further aspect, there is provided a computer implemented method comprising the steps of:

receiving design requirements of a software development project;

generating a dependency graph of components of the software development project based on the design requirements;

determining from the dependency graph a subset of components of the software development project having one or more dependencies related to a first component of the software development project;

determining from attributes of the first component a code intent;

retrieving from a first database storing natural language text describing components of the software development project used with an artificial intelligence code generator, natural language text describing one or more components of the software development project having one or more dependencies related to the first component that have been used to generate computer code stored in the second database using the artificial intelligence code generator;

retrieving from a second database storing computer code generated at least partially by the artificial intelligence code generator and defining components of the software development project and corresponding to the natural language text stored in the first database, computer code corresponding to the retrieved natural language text describing the one more components of the software development project having one or more dependencies related to the first component;

identifying from the computer code retrieved from the second database characteristics of objects within the computer code; and using a pre-trained language model, generating for the first component a natural language summary text based on the code intent of the first component, the identified characteristics of the objects, and the natural language text retrieved from the first database.

The methods described above may be implemented as a computer program comprising program instructions to operate a computer. The computer program may be stored on a computer-readable medium, including a non-transitory computer-readable medium.

The computer system may include a processor or processors (e.g. local, virtual or cloud-based) such as a Central Processing Unit (CPU), and/or a single or a collection of Graphics Processing Units (GPUs). The processor may execute logic in the form of a software program. The computer system may include a memory including volatile and non-volatile storage medium. A computer-readable medium (CRM) may be included to store the logic or program instructions. For example, embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape. The different parts of the system may be connected using a network (e.g. wireless networks and wired networks). The computer system may include one or more interfaces. The computer system may contain a suitable operating system such as UNIX, Windows (RTM) or Linux, for example.

Embodiments may also include one or more computers and one or more storage devices storing instructions that are operable, when executed by the one or more computers, to cause the one or more computers to perform the disclosed methods.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF EMBODIMENTS

A system provides a prompt orchestrator that can assist developers or automatically generate computer code without human intervention. The system uses artificial intelligence (AI) powered code generation tools. This system generates context specific prompts that are provided to the AI code generation tools and does this by taking into consideration various component (modules) under current development, as well as components developed in the past. The prompt orchestrator may take into account various application components like codebase, system architecture, high level design descriptions (and other compatible tools or documents), and prompts generated for related components, to generate new prompt that can be used to generate more accurate computer code with minimal or no further rework or required effort from a software developer. This mitigates future issues (e.g., security vulnerabilities, code bugs, etc.) that might otherwise arise when integrating different modules.

Figure 1:
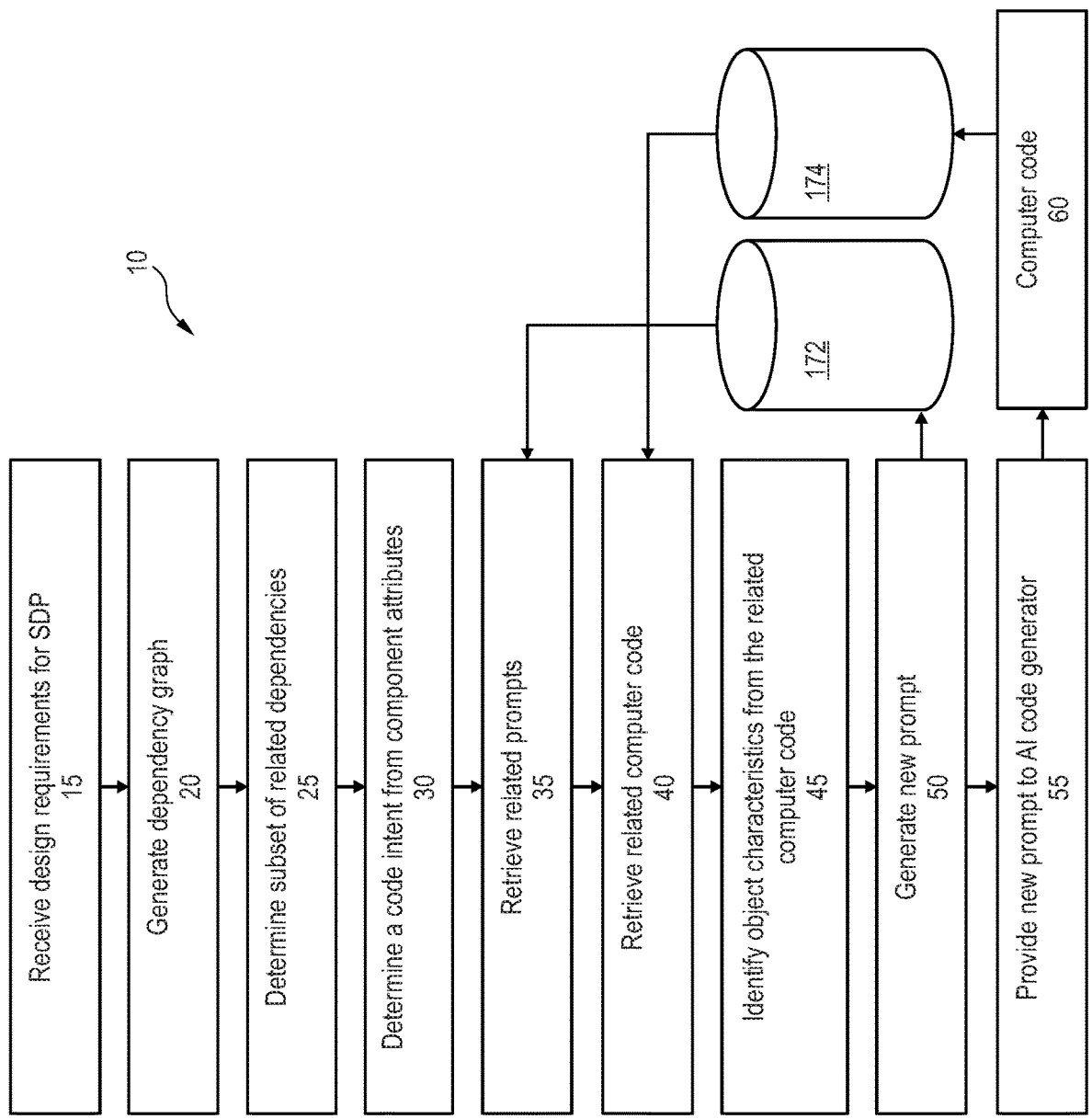
FIG. 1 shows a flowchart of a method for generating computer code, given by way of example only.

FIG. 1 shows a flowchart of an overview of a computer implemented method 10 for generating computer code using an AI code generator (e.g., GitHub Copilot, Amazon CodeWhisperer, etc.). At step 15, design requirements are received for a software development project (SDP). From these received design requirements, a dependency graph of components of the SDP is generated at step 20. From this dependency graph, a subset of the total number of components is determined related to one particular component of the SDP. The components in the subset of components have one or more dependencies related to the first or central component (step 25).

At step 30, a code intent of the central or first component or component under consideration is determined based on attributes of the central component. Natural language text describing the one or more components in the subset of components are retrieved from a prompt database 172 at step 35. Corresponding computer code to these components in the subset of components are retrieved from a code repository or computer code database 174 at step 40.

Characteristics of objects within the retrieved computer code are identified at step 45 and a pre-trained language model is used to generate for the central component a natural language summary text based on the code intent of the central component, the identified characteristics of the objects, and the natural language text retrieved from the prompt database at step 50.

This natural language summary text provides a prompt that may be sent to the AI code generator at step 55 (or otherwise used), which can then generate computer code at step 60. This generated computer code defines the central component in computer readable terms. The prompt and the generated computer code are saved in the prompt database 172 and computer code database 174, respectively.

The method 10 can assist developers by generating more appropriate and self-contained prompts. This can be done automatically to generate computer code with no or reduced developer input and can avoids issues that might otherwise arise during code integration of different modules.

In an example implementation, the system and method perform the following steps to generate more accurate natural language summary text (prompts) based on system architecture information, high level design requirements and other design requirements and existing prompts used in related other components or modules. The system architecture is converted to a dependency graph with nodes, entities, and appropriate relationship (edges) between the nodes. The high level design requirements are aligned with the dependency graph. The dependency graph is generated for different components (e.g., modules) of the existing codebase for the SDP. Some components may have already been coded and others have not yet been completed in the SDP.

A particular component that has not yet had its software code generated is considered or added to a development queue, for example. This may be the central, next or first component under consideration. For this central component, a sub-graph of dependencies is extracted from the full dependency graph. There may be different ways of doing this. For example, neighbouring nodes within the dependency graph around the central component may be extracted. This extraction may extend a certain distance in terms of nodes (e.g., one, two, three, four, etc. nodes away from the central component). This distance may be predetermined or adjustable. The components within the sub-graph may be considered to be a subset of components of the full SDP.

For the subset of components identified within the sub-graph, a database query is sent to the prompt database 172 to retrieve any or all prompts (natural language text) associated with this subset of components. Similarly, any or all software code associated with the subset of components is retrieved from the computer code database 174. These data are analysed and used determined intent and granular characteristics of various objects (variables, class, methods etc.) of the central component as it may have objects in common with its related components.

A new natural language text summary (prompt) for the central component is now generated based on and incorporating the information gained from the dependent components or modules. This can be provided to a developer within their workspace for manual adjustment, if necessary, or automatically processed, for example. The generated prompt is passed to the AI code generator, which generates an improved version of software code for the particular central component.

Figure 2:
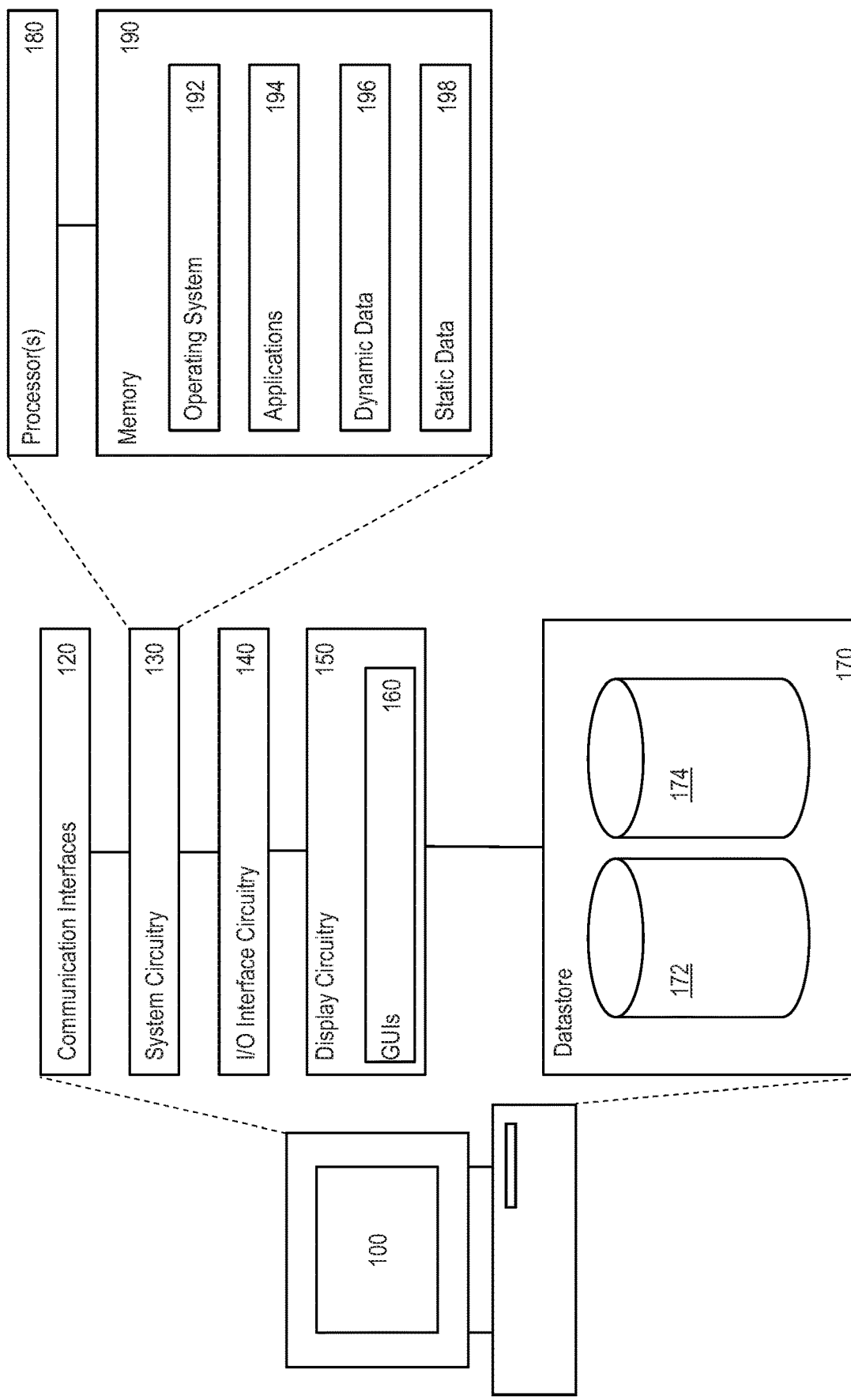
FIG. 2 shows a schematic diagram of a system for generating computer code and operating the method of FIG. 1.

The method and system may also be embedded in a computer program product (tangible and non-tangible), which includes any or all features enabling the implementation of the described method steps. FIG. 2 shows a schematic diagram of an example computer system 100 that is loaded with suitable instructions, is able to carry out these method steps.

As shown in FIG. 2, the computer system 100 includes a number of components including communication interfaces 120, system circuitry 130, input/output (I/O) circuitry 140, display circuitry and interfaces 150, and a datastore 170. The system circuitry 120 can include one or more processors or CPUs 180 and memory 190. The system circuitry 130 may include any combination of hardware, software, firmware, and/or other circuitry. The system circuitry 130 may be implemented, with one or more systems on a chip (SoC), application specific integrated circuits (ASIC), microprocessors, and/or analog and digital circuits.

The display circuitry may provide one or more graphical user interfaces (GUIs) 160 and the I/O interface circuitry 140 may include touch sensitive or non-touch displays, sound, voice or other recognition inputs, buttons, switches, speakers, sounders, and other user interface elements. The I/O interface circuitry 140 may include microphones, cameras, headset and microphone input/output connectors, Universal Serial Bus (USB) connectors, and SD or other memory card sockets. The I/O interface circuitry 140 may further include data media interfaces (e.g., a CD-ROM or DVD drive) and other bus and display interfaces.

The memory 190 may include volatile (RAM) or non-volatile memory (e.g., ROM or Flash memory). The memory may store the operating system 192 of the computer system 100, applications or software 194, dynamic data 196, and/or static data 198. The datastore or data source 170 may include one or more databases 172, 174 and/or a file store or file system, for example.

The method and system may be implemented in hardware, software, or a combination of hardware and software. The method and system may be implemented either as a server comprising a single computer system or as a distributed network of servers connected across a network. Any kind of computer system or other electronic apparatus may be adapted to carry out the described methods.

Figure 3:
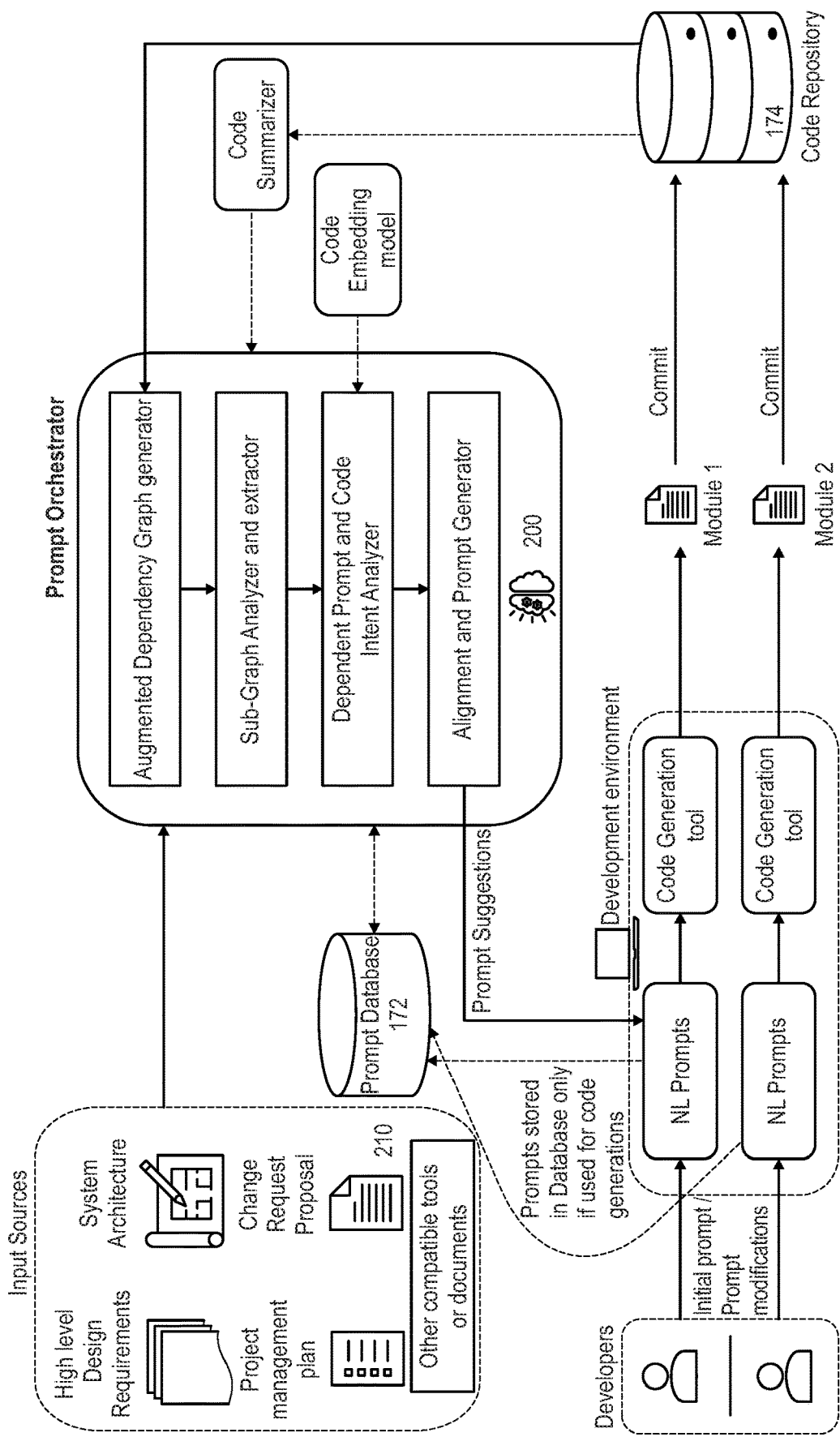
FIG. 3 shows a schematic diagram indicating the flow of steps used to implement the method of FIG. 1.

FIG. 3 shows a schematic diagram of system components and the flow of data implementing the method 10 described with reference to FIG. 1. FIG. 3 shows at a higher level, an overview of the process for generating computer code for the SDP.

A prompt orchestrator 200 forms the basis of the process and is in communication with the prompt database 172 and the computer code database or repository 174. As described previously, input sources 210 include high-level design requirements that may include system architecture documentation, project management plans, and/or change request proposals for any other data providing design requirements for the SDP. Developers may provide initial natural language prompts used to generate software code for implementing components within the SDP. However, the original prompts may be derived from other sources or other projects, for example. As shown in FIG. 3, the prompts that are stored in the prompt database 172 have already been passed through one or more AI code generators that provide components of the SDP (shown as module 1 and module 2 in the example of FIG. 3), which are stored within the computer code database 174 for future use. The prompt orchestrator 200 retrieves or receives input sources 210 in order to provide a dependency graph using an augmented dependency graph generator. A particular component (e.g., the central component that requires software code to be generated) is considered to identify the sub-graph and so identify the subset of components related to the central or first component. The prompts retrieved from the prompt database 172 relating to components within the subset of the components are analysed to determine their code intent or purpose behind the components. An external code embedding model may also be used in this stage of the process as well as a code summariser, which is used to analyse the software code to characterise objects within the computer code. This information, together with information defining attributes of the central component (e.g., extracted from the design requirements for the central component) is used to determine a code intent of the central component. This may be determined from the context of code intents determined from neighbouring components (e.g., by analysing the software code that defines them). These data are used within the alignment and prompt generator of the prompt orchestrator 200 to provide a prompt to the AI code generator so that further software code is generated for the SDP. These newly generated prompts can also be stored within the prompt database 172 and the output software code is stored within the computer code database 174. These new entries are associated with each other so that the corresponding prompt and output software can be retrieved together.

Figure 4:
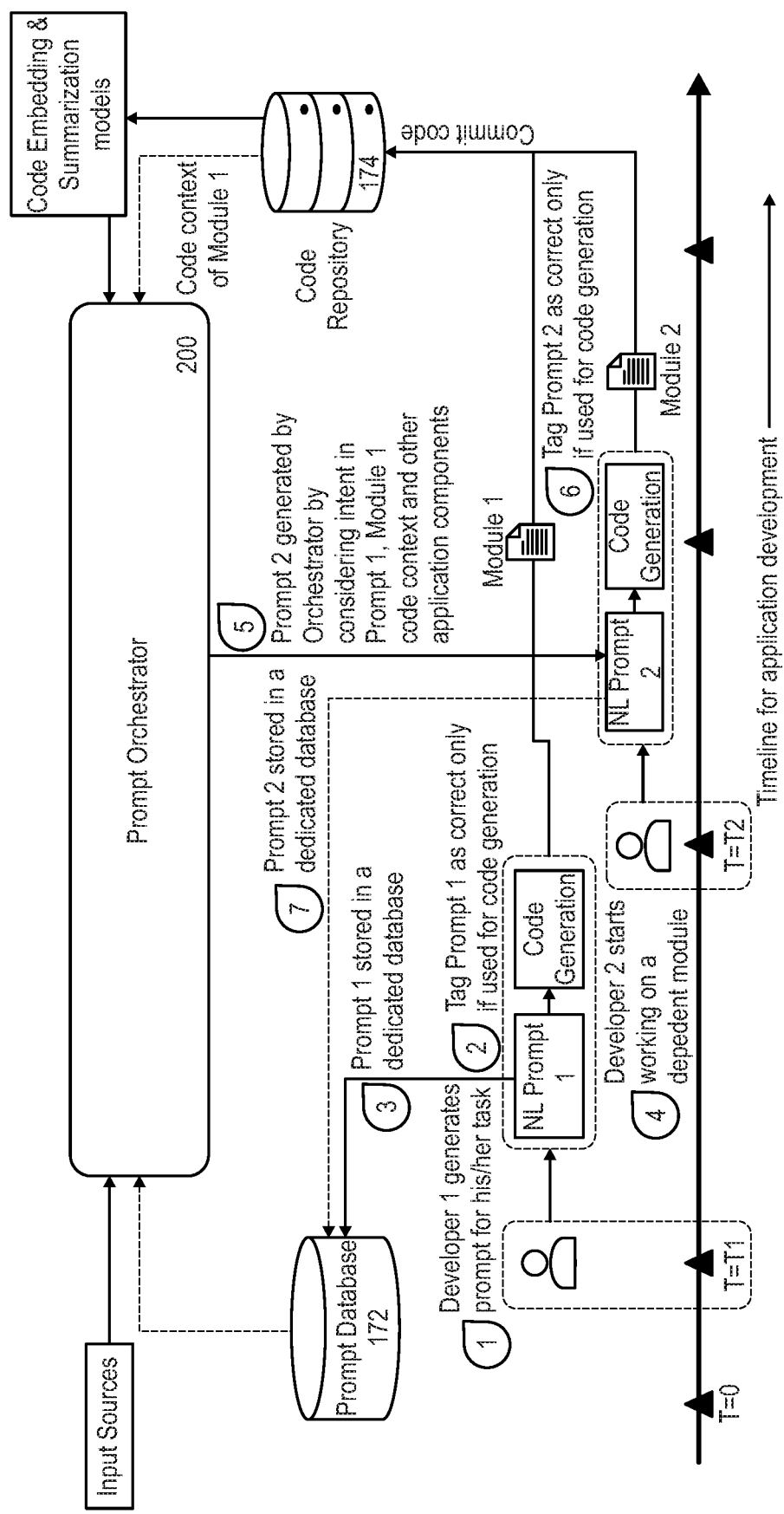
FIG. 4 shows a timing diagram indicating the timing of certain steps when implementing the method of FIG. 1.

FIG. 4 is a further schematic diagram illustrating the flow of data in the system but also including timing information with a timeline for application development moving from left to right. The integers also indicate certain ordered steps in the method 10. At the start of the process (T=0), the input sources described above are provided. At T=T1 (1) a first developer generates a particular prompt for a component that they have been tasked to produce. This prompt may be manually generated or generated using other tools. This natural language prompt (NL prompt 1) is passed to the AI code generator to generate software code for the component of the task of the first developer. The corresponding natural language prompt may be tagged as being correct if it is used for code generation (2). This first prompt (NL prompt 1) is stored in the prompt database 172 (3). The software code corresponding to the NL prompt 1 (module 1) is stored in the computer code database or code repository 174.

A second developer (developer 2) starts working on another component or module at time T=T2 (4). This component is related to or dependent on the component produced by developer 1 and already stored in the database 172, 174. Therefore, the prompt orchestrator 200 can use NL prompt 1 and associated software code (module 1) retrieved from prompt database 172 and computer code database 174 in order to automatically generate a new and compatible prompt (NL prompt 2). This uses information about the first component (module 1) including its intent, code context and other application components (5).

NL prompt 2 is passed to the AI code generator at time T=T2, which produces software code (module 2). Some tests may be used to validate module 2 and if correct and the software prompt (NL prompt 2) is suitable then the second prompt is tagged as being correct and stored within prompt database 172 (6). Other processing of the computer code may be carried out at later times, such as code embedding and summarisation modelling, for example.

Figure 5:
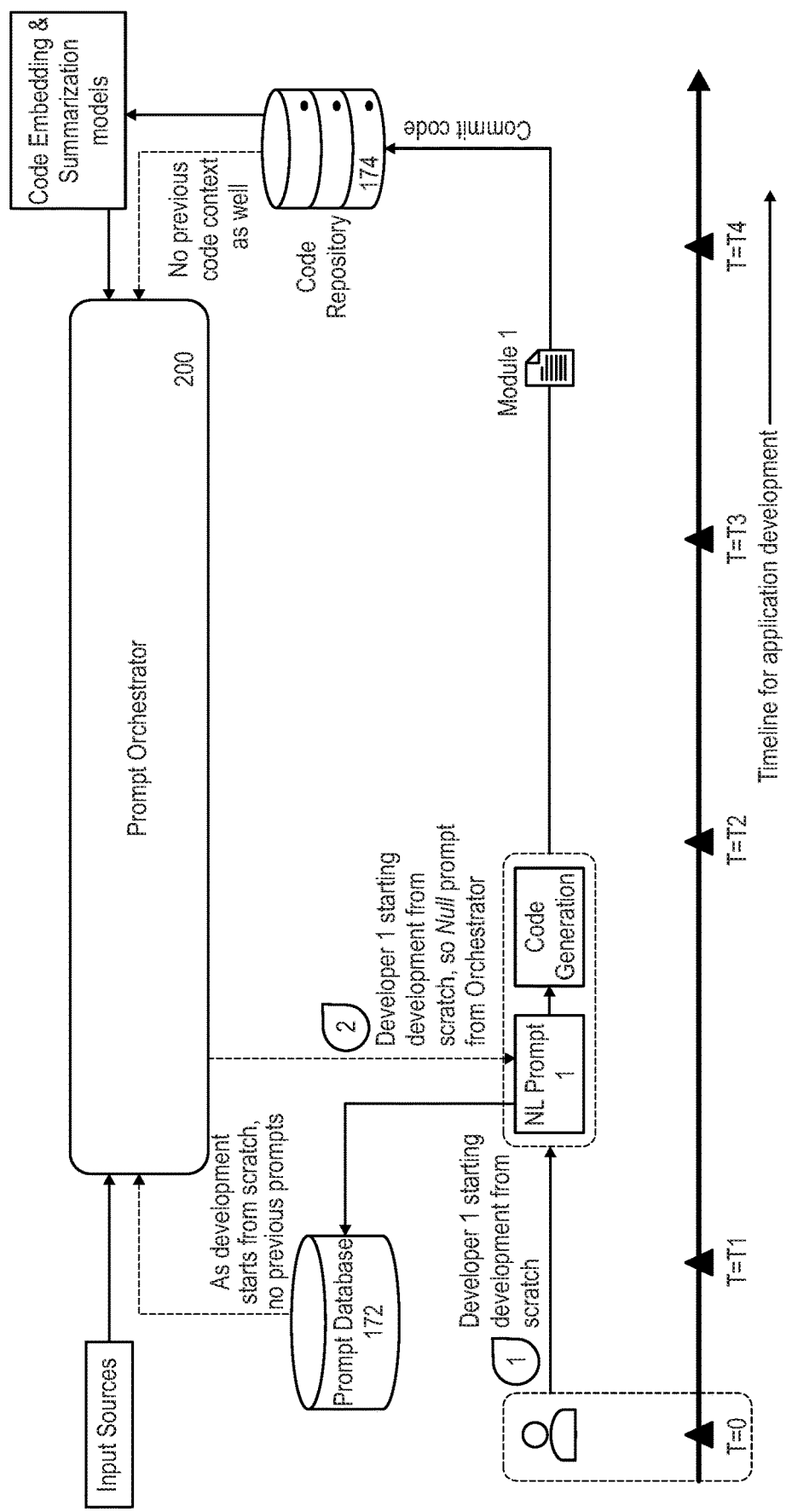
FIG. 5 shows a further timing diagram showing the flow of certain steps of the method of FIG. 1.

FIG. 5 illustrates the timing of particular steps when no related components are available to the prompt orchestrator 200. In this case, at time T=1, developer 1 must start developing a component by manually creating NL prompt 1 used to generate software code for the component (module 1). Both NL prompt 1 and the software code (module 1) are stored in the prompt database 172 and computer code database 174, respectively.

Figure 6:
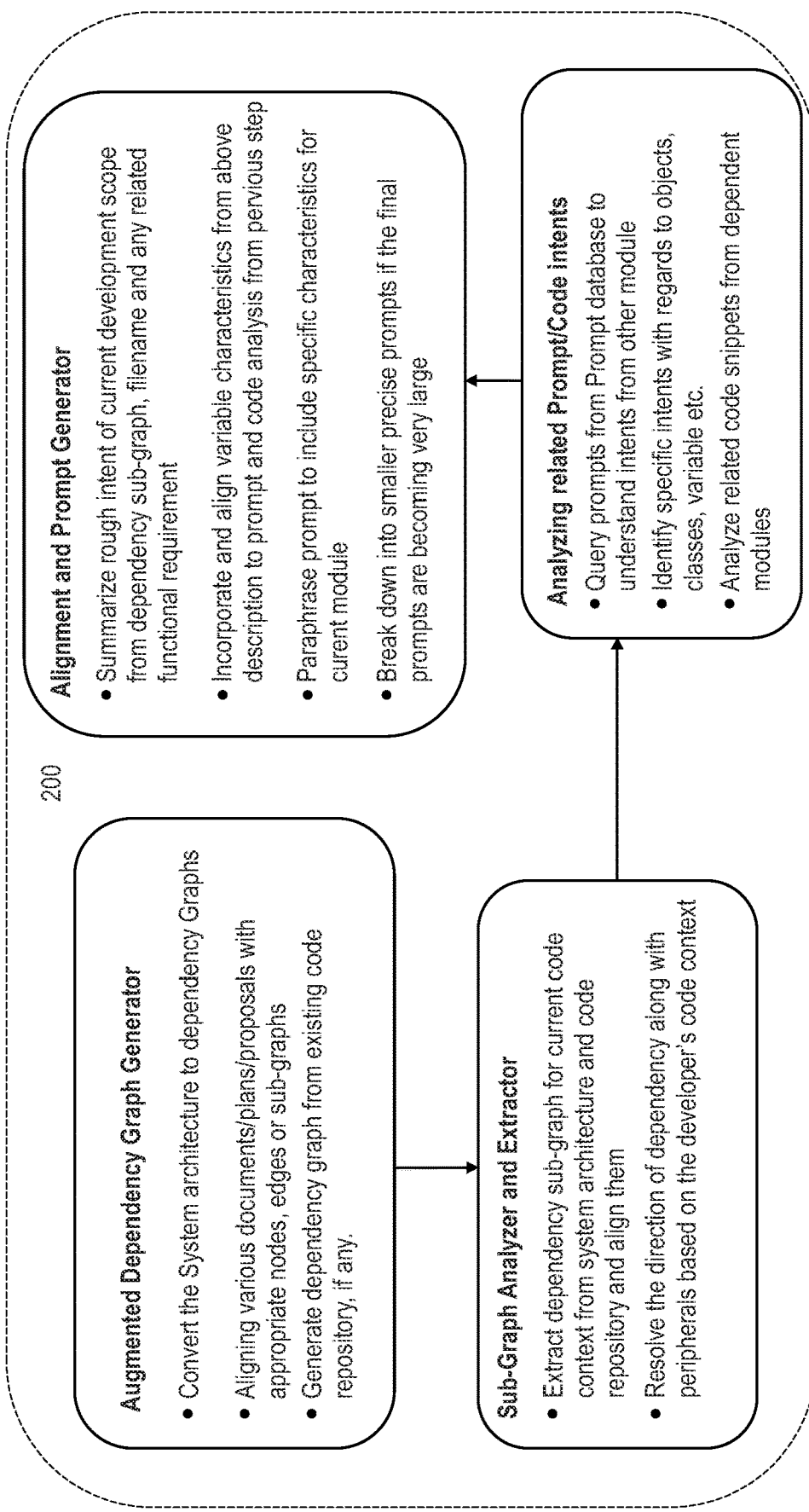
FIG. 6 shows a schematic diagram showing further components of the system of FIG. 2.

FIG. 6 illustrates example steps used to implement the method 10, which may be carried out by the prompt orchestrator 200. This figure illustrates the various steps for generating a dependency graph including converting the input sources (e.g., system architecture) to dependency graphs, aligning various documents, plans, proposals and other documentation with appropriate nodes to define edges or sub-graphs. The dependency graph may also be generated at least partially from existing code within the computer code database 174.

For a particular sub-graph, various analysis steps may take place including extracting dependencies for a particular code context from the system architecture and the computer code so that they may be aligned. Any directions in dependency may be resolved, based on code context, which may be provided by a developer or from elsewhere.

For a particular component or module that has not yet been processed for which the prompt orchestrator 200 is used to generate the natural language prompt, related prompts may be queried from the prompt database 172 in order to understand code intents for the present component under development and other related components (modules). Specific code intents may be identified with regards to objects, classes, variables, and other software items. Portions of computer code from the dependent components (modules) may also be analysed.

A rough intent of the current component may be summarised using the sub-graph of dependencies, file names and any related functional requirements that may be retrieved from the input sources. Characteristics of variables of other objects may be incorporated and aligned using this information obtained from previous steps. The rough prompt may be paraphrased to include specific characteristics for the current module using natural language processing. If the resultant natural language text prompt is greater than a predetermined length, then it may be broken down into smaller and more precise prompts where necessary.

Figure 7:
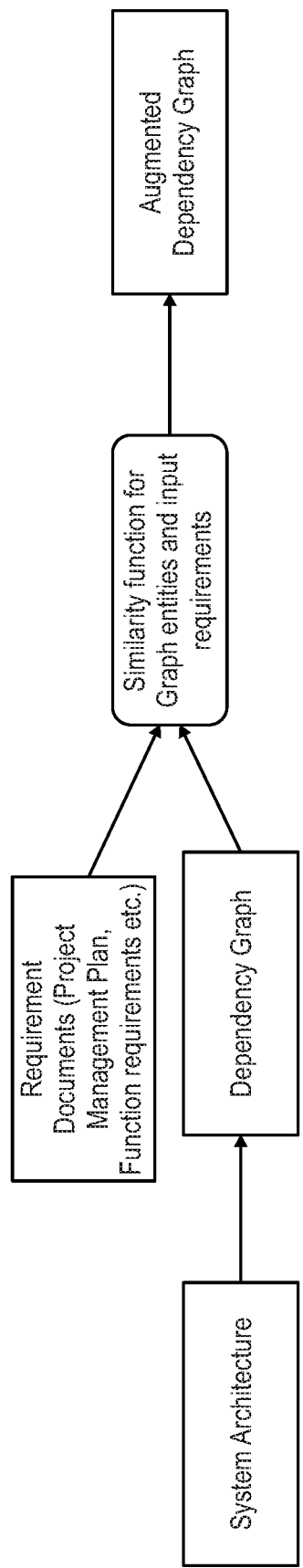
FIG. 7 shows a flowchart indicating a portion of the method of FIG. 1.
Figure 8:
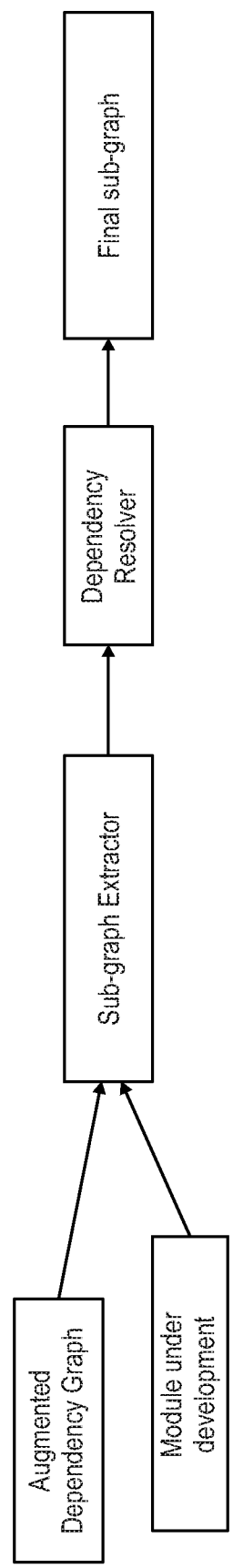
FIG. 8 shows a schematic diagram showing further steps of the method of FIG. 1.

FIGS. 7 and 8 illustrate these steps schematically. FIG. 7 shows how the system architecture is used to generate a dependency graph and the design requirements are provided with the dependency graph to determine components that are similar using a similarity function for individual graph entities. This provides an augmented dependency graph including this additional information, which provides the relationships between different components. FIG. 8 shows how the augmented dependency graph is processed for a particular component or module under development, so that a portion of the augmented dependency graph provides a sub-graph which is extracted and that contains a subset of components related to the component under development. Dependencies may be resolved where necessary, which results in a final sub-graph and a subset of components related to the component under development.

Figure 9:
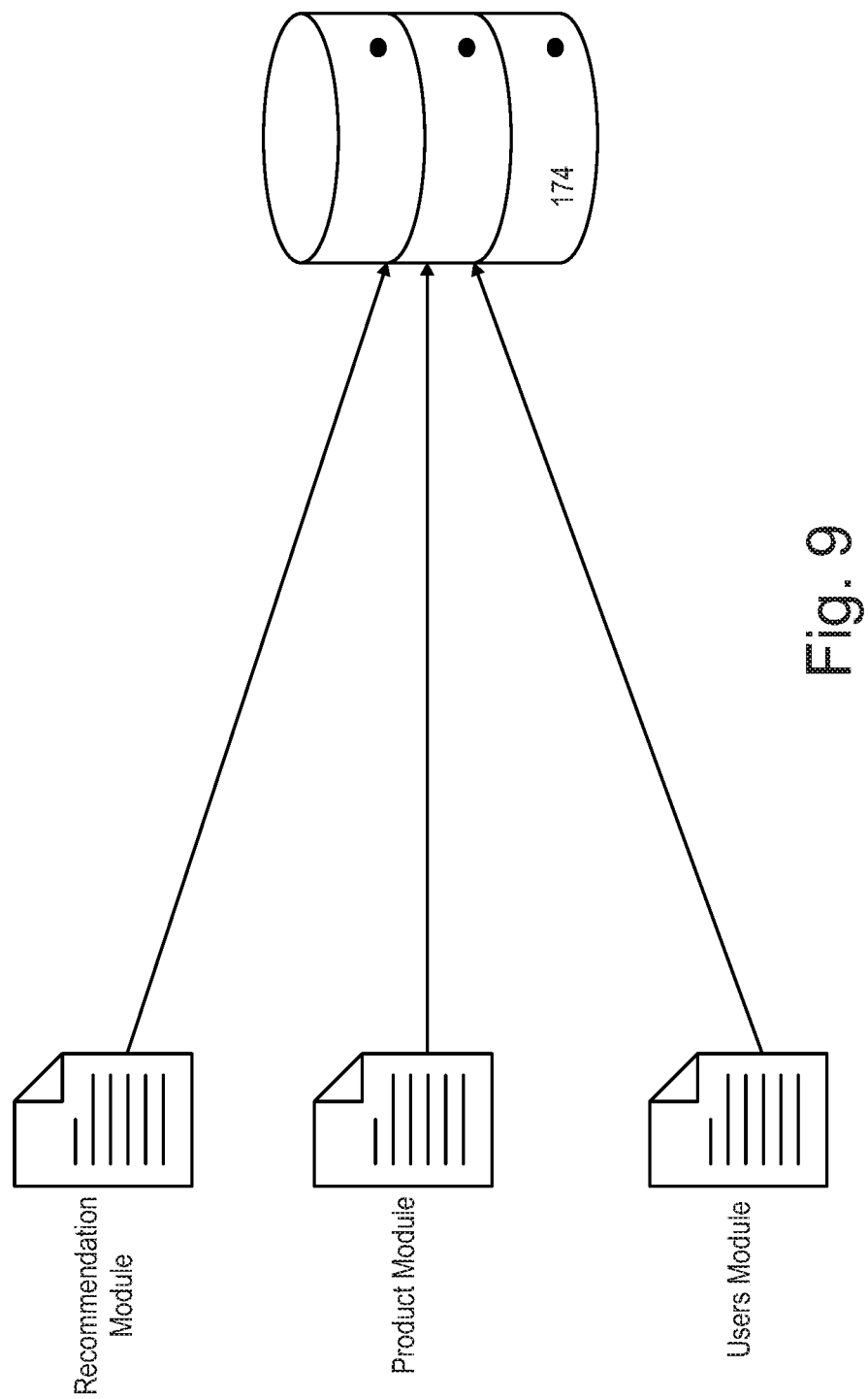
FIG. 9 shows a schematic diagram of data used within the method of FIG. 1.

FIG. 9 shows how an example structure of the computer code database 174, including recommendation modules, product modules and user modules, for example. This data structure is provided as an example only and other component types may be included.

Figure 10:
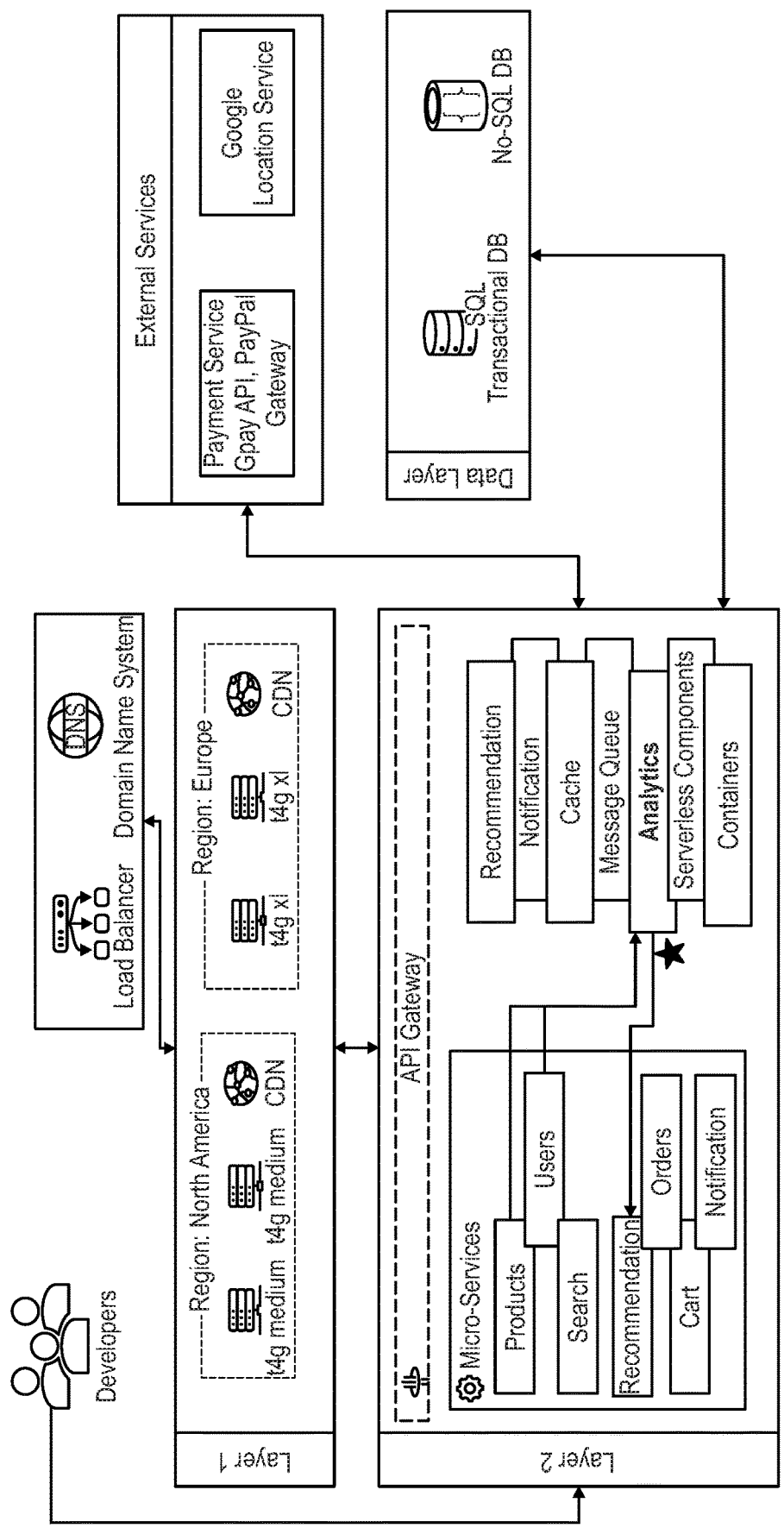
FIG. 10 shows a schematic diagram of input data used to generate computer code using the method of FIG. 1.

FIG. 10 shows a schematic diagram of example design requirements that may be processed by the method 10. It is noted that this includes example architecture entities, which are provided as an example only and other architecture documents may be provided. Example design requirements provided and as input sources may include:

Requirement 1—The application should provide recommendations to user based on past purchases;
Requirement 2—The application should provide a Dashboard to Admin, to visualize all past purchases/transactions and user details; and
Requirement 3—A search engine for product search should be present.

Figure 11:
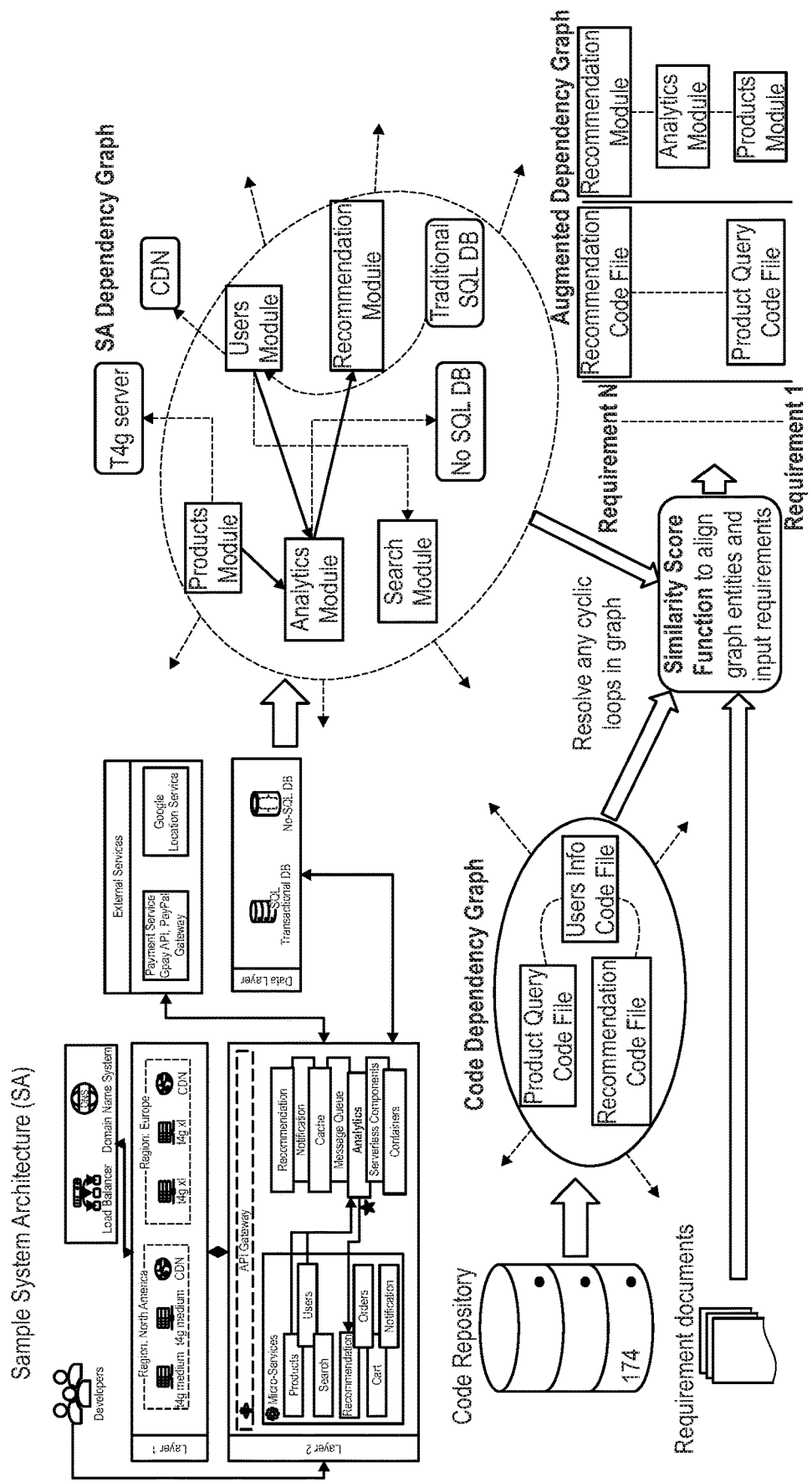
FIG. 11 shows a flowchart of a further example method for generating computer code.
Figure 12:
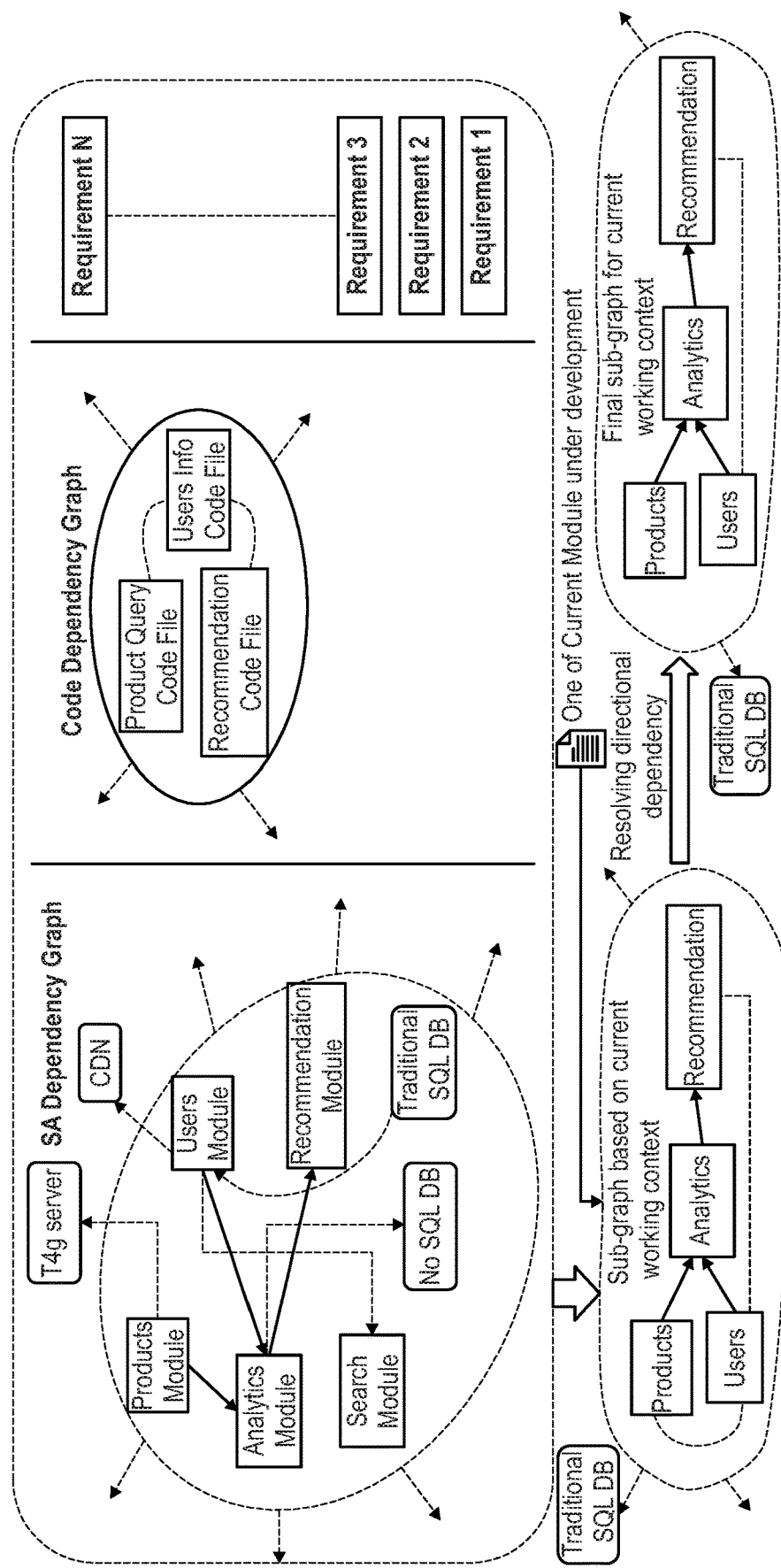
FIG. 12 shows a flowchart of a further example method for generating computer code.

FIG. 11 shows a worked example using these example design requirements and an example dependency graph of the components (modules) shown in FIG. 9. In this example, a code dependency graph is also produced from the software code stored in the computer code database 174. This information is used to generate the augmented dependency graph with related or neighbouring components grouped together. FIG. 12 illustrates schematically how the sub-graph of dependencies is used as any direction or dependency is resolved for a particular component of the SDP.

Figure 13:
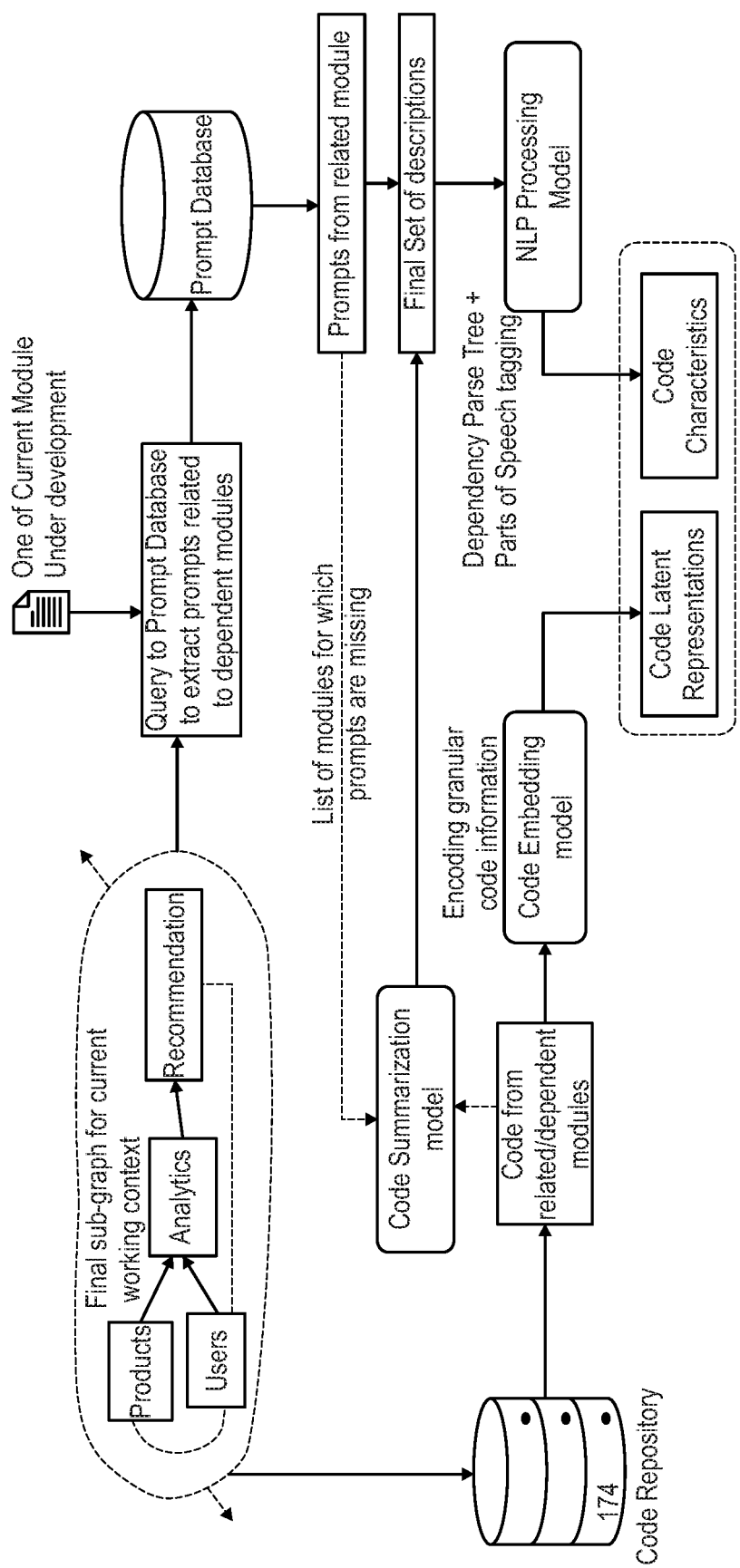
FIG. 13 shows a flowchart of a further example method for generating computer code.

FIG. 13 shows how further processing steps may be taken to improve the natural language prompts. This Figure also shows how further components (modules) that have not yet had their computer code generated, have their prompts generated using the subset of related components, the natural language prompts retrieved from the database used to generate related components together with the software code defining the related components.

Figure 14:
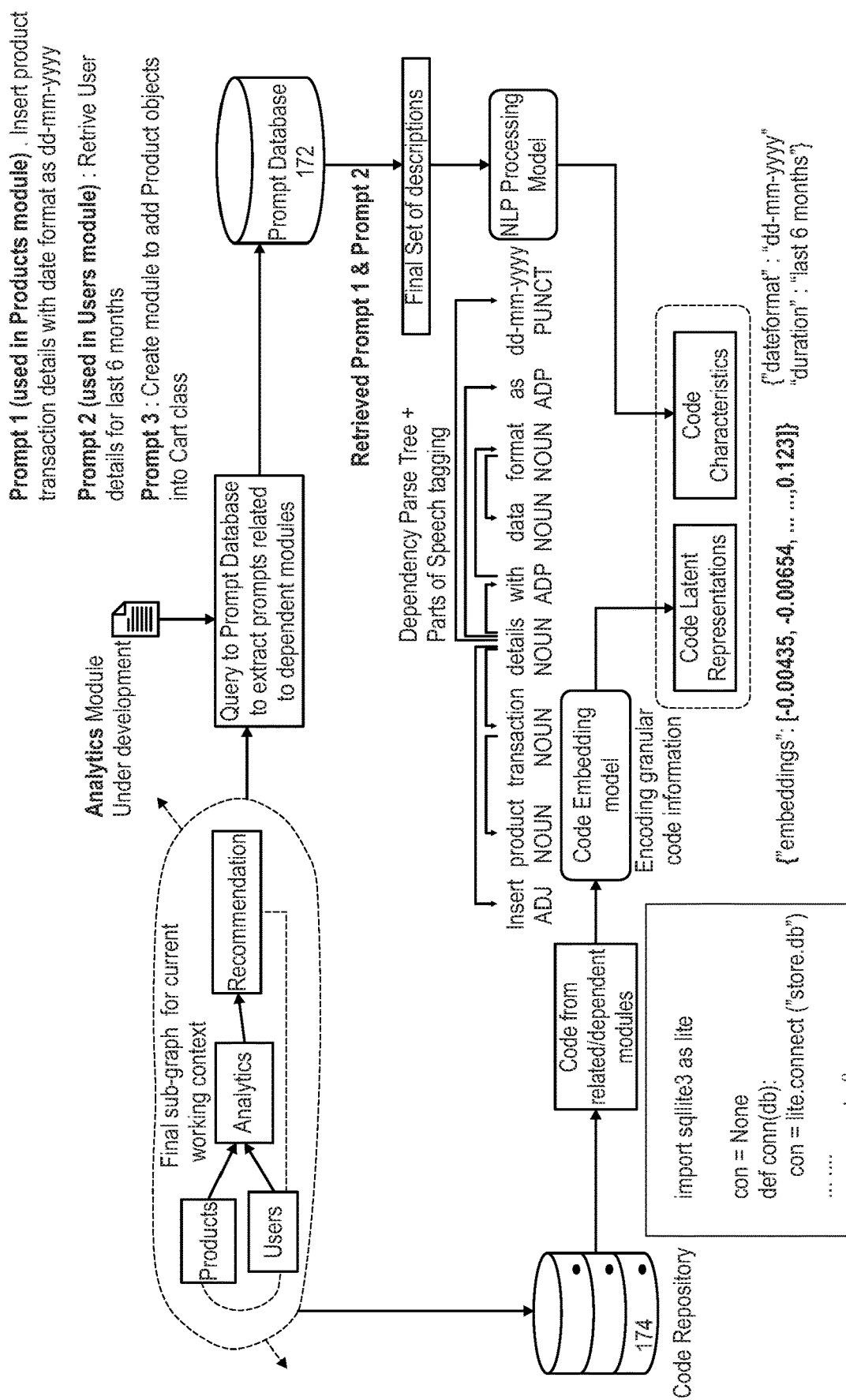
FIG. 14 shows a flowchart of an example portion of steps within the method of FIG. 1.

FIG. 14 illustrates a worked example of the process using particular example data. As can be seen from this figure, computer code from related or dependent components (modules) are retrieved and analysed and the code embedding module is used to identify code latent representations. Natural language prompts for related or dependent components are also used to generate code characteristics for the component under consideration. In this case, a particular data format is identified and so the same date format is used for the present component being processed.

In this example, the prompts may include:
Prompt 1 used by first developer:
"Insert transaction details into transaction table. Parse date as datetime "% d-% m-% Y".
Prompt 2 used by second developer:
"Extract transaction details with date in last 6 months".
The computer code generated for Prompt 2 may result in defective code since it does not consider the date time format specified as per Requirement 1 (described previously) and in prompt 1.

The prompt orchestrator 200 may match the two requirements and suggest the below prompt, which results in improved computer code.

"Extract transaction details with date in last 6 months. Parse date as datetime "% d-% m-% Y"."

Figure 15:
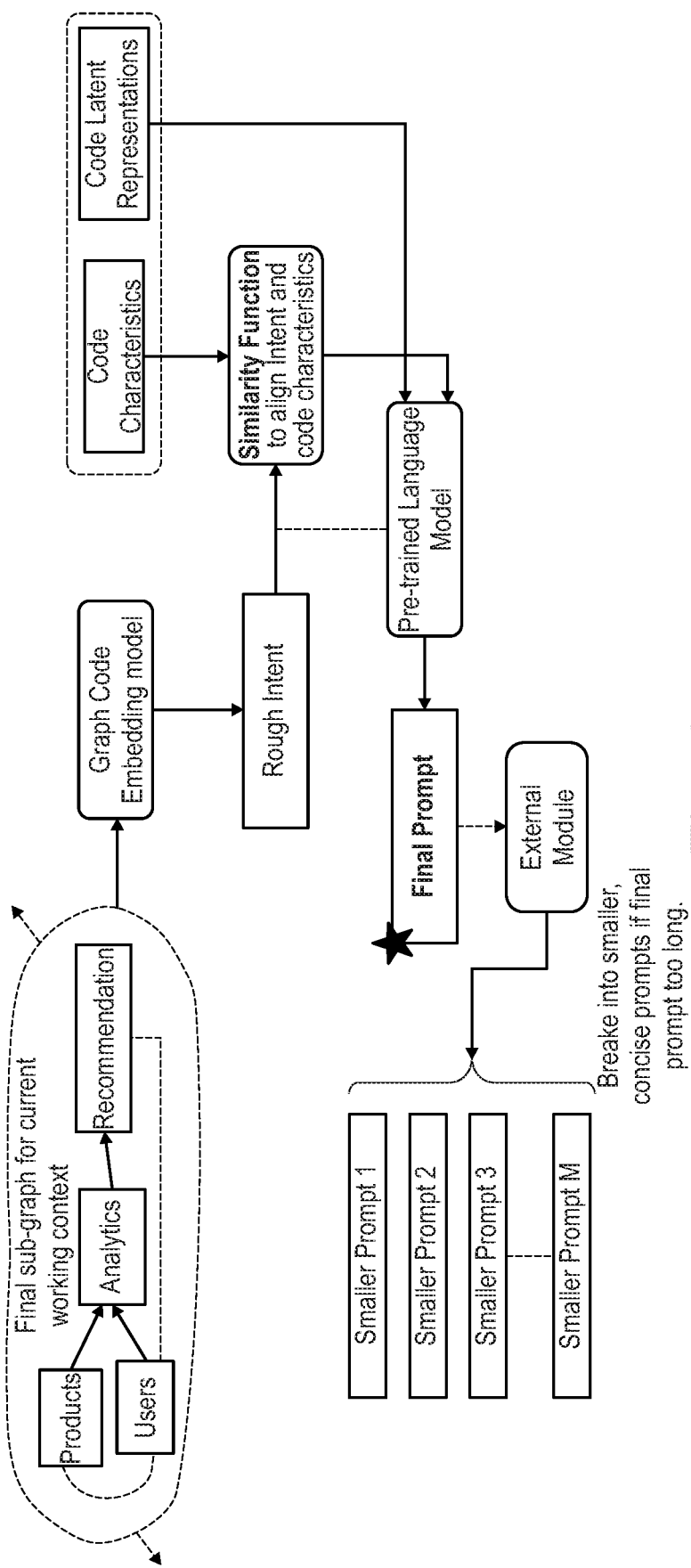
FIG. 15 shows a flowchart of example steps within the method of FIG. 1.
Figure 16:
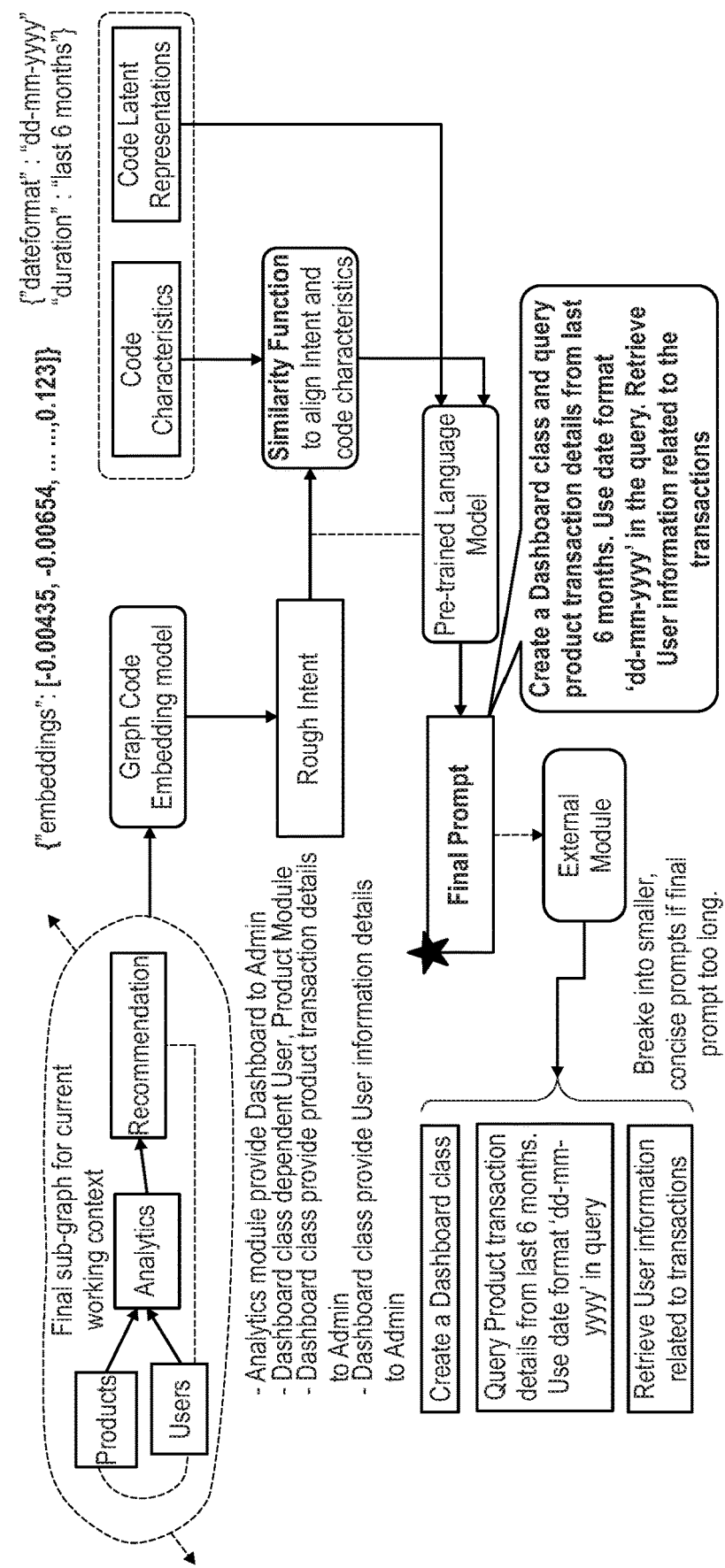
FIG. 16 shows a further flowchart of example steps within the method of FIG. 1.

FIG. 15 shows how the pre-trained language model is used to generate a final prompt, which is divided into smaller prompts, as necessary. FIG. 16 shows a similar flow of method steps but includes example data retrieved for a particular components and related components. In this case, the final prompt includes the text of requesting the creation of a dashboard class and queries product transaction details from the last six months based on the information provided to the prompt orchestrator 200. A particular date format is also defined as this has come from a related component. The final prompt includes several separate requirements, which are divided into sub-prompts that can be sent to the AI software code generator.

The following provides a high level flow of the method 10. Given the input sources shown in FIG. 3, including high level design documents or requirements and system architecture materials for the SDP, the input sources 210 are converted to a dependency graph where entities, components, and other relationships in the architecture are mapped to various high level design requirements. Depending on the developer's current task (i.e., component that they need to code) and their current working module, a sub-graph is extracted from the entire dependency graph, which relates to the particular or central component (under construction). Necessary architecture components related to this central component are included in the sub-graph. Graph traversal algorithms (e.g., depth first search-DFS) may be employed during this step. Component (modules) which have a direct relation with the current working component are included in the sub-graph. The direction of the dependency may also be resolved during this step.

The prompt orchestrator 200 queries the prompt database 172 to retrieve the prompts and analyse them to retrieve or determine their intents. The prompt orchestrator 200 may also parse software code snippets of dependent or related components (modules) present in the sub-graph and included in a subset of related components, to identify any specific characteristics of variables, classes, objects, etc.

The prompt orchestrator 200 generates a rough summary text based on the dependency sub-graph and appends information regarding any specific characteristics, by aligning to the rough summary. The final prompt is generated by paraphrasing this rough summary text, while including all the necessary information. This may be achieved using a natural language processor.

The following describes at a high level, a further example method for generating the sub-graph and subset of components related to the central component (i.e., how the dependency graph is generated from design requirements). Once provided with the design requirements that may include a system architecture flowchart or other architecture definitions, the dependency graph is generated by identifying nodes (components or entities) and edges (i.e., relationships) between them. Design requirements, in the form of system architecture documentation, can be stored in a structured format like JSON or XML, which may be parsed through custom logic to create the dependency graph. If stored as images, AI models like GIT (Generative Image-to-Text Transformer) models can be used to first generate a description of the image and then apply natural language processing (NLP) techniques (e.g., using the Stanza library) and identify entities and relationships between them.

A dependency graph may also be generated from the existing software code repository (e.g., using the pydeps library) and this dependency graph may be mapped to the dependency graph generated from the system requirements (e.g., system architecture) based on a similarity metric (e.g., l2-norm). Any cyclic loops in the dependency graph may be detected and resolved resulting in a Directed Acyclic Graph (DAG), for example.

The high level/functional requirements may be aligned with the dependency graph entities (components). To align high level requirements to various graph parts, sentence embedding (e.g., using ROBERTa) may be generated for the requirements and a similarity metric may be calculated (e.g., using cosine similarity) to match to the closest entities or components.

A further process may be used to analyse the sub-graph and how related components are identified. This may use information stored within a working directory or component (module) of the developer. The sub-graphs pertaining to the current component or task may be extracted by traversing the dependency graph of design requirements (e.g., system architecture) and software code repository. By mapping the current or central component (module) being worked on by the developer, an equivalent node in the dependency graph may be identified. Dependent or neighbouring components or nodes that have a direct edge to the current node may be extracted. In this manner, any components (modules) that exhibit some sort of dependency with current components (e.g., inputs, outputs, parameters, functions, etc.) are identified and extracted.

The system requirements, including system architecture may be processed to generate an extended sub-graph that is extracted by employing a traversal algorithm (e.g., Djikstra algorithm, and/or Bellman Ford algorithm), which finds the shortest path to important components like databases, hardware layers, etc. When applying the algorithms, it may be assumed that the edge weight is the same under all circumstances. Directional dependencies may then be resolved between modules and other components.

Prompts and code intents may be analysed as follows. Developers have previously been using AI code generation tools to augment the software development process. Therefore, software developers may use natural language prompts provided to the AI code generator. Any prompt that has been used is stored (optionally synchronously) in the prompt database 172. The method queries the prompt database 172 to find any prompts related to components in the extracted sub-graph and forming the subset of components.

The intent of the textual prompt (i.e., code intent) and any specific characteristics of the code generated using this prompt for particular components may be extracted. This may be achieved by creating a dependency parse tree (e.g., using the Stanza library) from the prompt and the Parts-of-speech Tagger may be applied to identify the subject (code components) and its characteristics (e.g., adjectives).

Should the queries fail to return any prompts for related components, the method may then employ Neural Code Summarization (e.g., PLBART, CodeBERT) modules to take code snippets from the software code that may be present and extract the code intent or prompt summary from this in isolation. However, both processes may be combined. However, this is achieved, to understand specific characteristics of the code snippets, the method may employ a pre-trained code understanding model (e.g., CodeBERT), which may output a meaningful latent representation of the code snippets. The latent representation may capture specific characteristics of the code, which may then encode the specific characteristics in a final prompt.

The final textual prompt may be generated following further processing. This may include generating a rough draft of the prompt intent by incorporating information from the dependency sub-graph (subsets of components), component name and/or related high level functional requirements. The rough intent summary may be generated by leveraging pre-trained Code-Graph models (e.g., using Graph Code BERT) to convert sub-graphs to latent representations and further use the representation to generate a natural language summary. The sub-graphs may be flattened (e.g., using pre-order depth first traversal, and/or a fLAST library) and may also be tokenized (e.g., using the Stanza library) before being passed to pre-trained Graph Code models.

Code characteristics (e.g., in the form of a latent representation) from the previous method steps may be aligned to the rough intent generated by the previous step. The characteristics and intent may be aligned by measuring their similarity (e.g., using l2-norm, and/or cosine similarity) between word and code representations.

The method can leverage a pre-trained language model (e.g., using the OpenAI GPT-3 model) to combine various inputs from previous steps and generate a complete, self-contained prompt for the code generator. This method may employ a pre-trained model where the rough intent (mentioned above) may be converted to an intermediate latent representation, which may then be appended to the sub-graph latent representation as well as the latent code representation to be processed by the pre-trained model.

If the prompt's length is greater than a predetermined value, the method may break it down into smaller, more concise prompts using external techniques, which may help AI code generation tools to provide improved computer code.

As used throughout, including in the claims, unless the context indicates otherwise, singular forms of the terms herein are to be construed as including the plural form and vice versa. For instance, unless the context indicates otherwise, a singular reference herein including in the claims, such as "a" or "an" (such as an ion multipole device) means "one or more" (for instance, one or more ion multipole device). Throughout the description and claims of this disclosure, the words "comprise", "including", "having" and "contain" and variations of the words, for example "comprising" and "comprises" or similar, mean "including but not limited to", and are not intended to (and do not) exclude other components. Also, the use of "or" is inclusive, such that the phrase "A or B" is true when "A" is true, "B is true", or both "A" and "B" are true.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

The terms "first" and "second" may be reversed without changing the scope of the disclosure. That is, an element termed a "first" element may instead be termed a "second" element and an element termed a "second" element may instead be considered a "first" element.

Any steps described in this specification may be performed in any order or simultaneously unless stated or the context requires otherwise. Moreover, where a step is described as being performed after a step, this does not preclude intervening steps being performed.

It is also to be understood that, for any given component or embodiment described throughout, any of the possible candidates or alternatives listed for that component may generally be used individually or in combination with one another, unless implicitly or explicitly understood or stated otherwise. It will be understood that any list of such candidates or alternatives is merely illustrative, not limiting, unless implicitly or explicitly understood or stated otherwise.

Unless otherwise described, all technical and scientific terms used throughout have a meaning as is commonly understood by one of ordinary skill in the art to which the various embodiments described herein belongs.

As will be appreciated by the skilled person, details of the above embodiment may be varied without departing from the scope of the present invention, as defined by the appended claims.

For example, different AI code generators or natural language processors may be used.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

Further example implementations are provided in the following numbered clauses.

1. A system for generating computer code for a one or more components of a software development project, the system comprising:
   an artificial intelligence code generator configured to generate computer code in response to a natural language text input describing a component of the software development project;
   a first database configured to store natural language text describing components of the software development project used with the artificial intelligence code generator;
   a second database configured to store computer code generated at least partially by the artificial intelligence code generator and defining components of the software development project and corresponding to the natural language text stored in the first database; and
   means adapted to execute the steps of:
      receive design requirements of the software development project;
      generate a dependency graph of components of the software development project based on the design requirements;
      determine from the dependency graph a subset of components of the software development project having one or more dependencies related to a first component of the software development project;
      determine from attributes of the first component a code intent;
      retrieve from the first database natural language text describing one or more components of the software development project having one or more dependencies related to the first component that have been used to generate computer code stored in the second database using the artificial intelligence code generator;
      retrieve from the second database computer code corresponding to the retrieved natural language text describing the one more components of the software development project having one or more dependencies related to the first component;
      identify from the computer code retrieved from the second database characteristics of objects within the computer code;
      using a pre-trained language model, generate for the first component a natural language summary text based on the code intent of the first component, the identified characteristics of the objects, and the natural language text retrieved from the first database;
      provide the natural language summary text for the first component to the artificial intelligence code generator; and
      the artificial intelligence code generator generating computer code for the first component based on the provided natural language summary.

2. The system of clause 1, wherein the means are further adapted to execute the step of:
   before determining the subset of components of the software development project having one or more dependencies related to the first component, receiving information describing the first component of the plurality of components of the software development project, wherein the attributes of the first component are determined from the received information.

3. The system of clause 2, wherein the received information is a title of the first component.

4. The system according to any previous clause, wherein the means are further adapted to execute the step of:
   storing the computer code for the first component in the second database and the natural language summary text for the first component in the first database.

5. The system according to any previous clause, wherein the design requirements of the software development project comprise any one or more of: high level design requirements, system architecture, project management path, and change request proposals.

6. A method for generating computer code for one or more components of a software development project, the method comprising the steps of:
   receiving design requirements of a software development project;
   generating a dependency graph of components of the software development project based on the design requirements;
   determining from the dependency graph a subset of components of the software development project having one or more dependencies related to a first component of the software development project;
   determining from attributes of the first component a code intent;
   retrieving from a first database storing natural language text describing components of the software development project used with an artificial intelligence code generator, natural language text describing one or more components of the software development project having one or more dependencies related to the first component that have been used to generate computer code stored in the second database using the artificial intelligence code generator;
   retrieving from a second database storing computer code generated at least partially by the artificial intelligence code generator and defining components of the software development project and corresponding to the natural language text stored in the first database, computer code corresponding to the retrieved natural language text describing the one more components of the software development project having one or more dependencies related to the first component;

identifying from the computer code retrieved from the second database characteristics of objects within the computer code;

using a pre-trained language model, generating for the first component a natural language summary text based on the code intent of the first component, the identified characteristics of the objects, and the natural language text retrieved from the first database;

providing the natural language summary text for the first component to the artificial intelligence code generator; and generating computer code for the first component using the artificial intelligence code generator, based on the provided natural language summary.

7. The method of clause 6 further comprising the step of:
before determining the subset of components of the software development project having one or more dependencies related to the first component, receiving information describing the first component of the plurality of components of the software development project, wherein the attributes of the first component are determined from the received information.

8. The method of clause 7, wherein the information describing the first component of the plurality of components is received from a graphical user interface, GUI.

9. The method of clause 7 or clause 8, wherein the received information is a title of the first component.

10. The method according to any of clauses 6 to 9 further comprising the step of:
storing the computer code for the first component in the second database and the natural language summary text for the first component in the first database.

11. The method according to any of clauses 6 to 10, wherein the design requirements of the software development project comprise any one or more of: high level design requirements, system architecture, project management path, and change request proposals.

12. The method according to any of clause 6 to 11, wherein the step of determining a subset of components of the software development project having one or more dependencies related to a first component further comprises the step of flattening, tokenizing, and/or resolving direction dependencies between components in the subset of components within the dependency graph.

13. The method according to any of clauses 6 to 12 further comprising the step of:
before providing the natural language summary text for the first component to the artificial intelligence code generator, splitting the natural language summary text into smaller natural language summary texts each below a predetermined length.

14. The method according to any of clauses 6 to 12, wherein the step of generating for the first component a natural language summary text based on the code intent of the first component further comprises iteratively aligning a rough natural language summary text with the characteristics of objects within the computer code by measuring a similarity between words in the rough natural language summary text and corresponding computer code until the measure of similarity is increased.

15. A computer-readable medium comprising instructions which, when executed by a computer, cause the computer to carry out the steps of the method according to any of clauses 6 to 14.

The invention claimed is:

1. A computer implemented method for generating computer code for one or more components of a software development project, the method comprising the steps of:
receiving design requirements of a software development project;
generating a dependency graph of components of the software development project based on the design requirements;
determining from the dependency graph a subset of components of the software development project having one or more dependencies related to a first component of the software development project;
determining from attributes of the first component a code intent;
retrieving from a first database storing natural language text describing components of the software development project used with an artificial intelligence code generator, natural language text describing one or more components of the software development project having one or more dependencies related to the first component that have been used to generate computer code stored in the second database using the artificial intelligence code generator;
retrieving from a second database storing computer code generated at least partially by the artificial intelligence code generator and defining components of the software development project and corresponding to the natural language text stored in the first database, computer code corresponding to the retrieved natural language text describing the one or more components of the software development project having one or more dependencies related to the first component;
identifying from the computer code retrieved from the second database characteristics of objects within the computer code;
using a pre-trained language model, generating for the first component a natural language summary text based on the code intent of the first component, the identified characteristics of the objects, and the natural language text retrieved from the first database;
providing the natural language summary text for the first component to the artificial intelligence code generator; and
generating computer code for the first component using the artificial intelligence code generator, based on the provided natural language summary.

2. The method of claim 1 further comprising the step of:
before determining the subset of components of the software development project having one or more dependencies related to the first component, receiving information describing the first component of the plurality of components of the software development project, wherein the attributes of the first component are determined from the received information.

3. The method of claim 2, wherein the information describing the first component of the plurality of components is received from a graphical user interface, GUI.

4. The method of claim 2, wherein the received information is a title of the first component.

5. The method according to claim 1 further comprising the step of:
storing the computer code for the first component in the second database and the natural language summary text for the first component in the first database.

6. The method according to claim 1, wherein the design requirements of the software development project comprise any one or more of: high level design requirements, system architecture, project management path, and change request proposals.

7. The method according to claim 1, wherein the step of determining a subset of components of the software development project having one or more dependencies related to a first component further comprises the step of flattening, tokenizing, and/or resolving direction dependencies between components in the subset of components within the dependency graph.

8. The method according to claim 1 further comprising the step of:
before providing the natural language summary text for the first component to the artificial intelligence code generator, splitting the natural language summary text into smaller natural language summary texts each below a predetermined length.

9. The method according to claim 1, wherein the step of generating for the first component a natural language summary text based on the code intent of the first component further comprises iteratively aligning a rough natural language summary text with the characteristics of objects within the computer code by measuring a similarity between words in the rough natural language summary text and corresponding computer code until the measure of similarity is increased.

10. A system for generating computer code for a one or more components of a software development project, the system comprising:
one or more computers including one or more hardware processors and one or more non-transitory storage devices storing computer executable instructions;
the one or more non-transitory storage devices including:
an artificial intelligence code generator generating computer code in response to a natural language text input describing a component of the software development project;
a first database storing natural language text describing components of the software development project used with the artificial intelligence code generator;
a second database storing computer code generated at least partially by the artificial intelligence code generator and defining components of the software development project and corresponding to the natural language text stored in the first database; and
the computer executable instructions when executed by the one or more computers, to cause the one or more computers to execute the steps of:
receive design requirements of the software development project;
generate a dependency graph of components of the software development project based on the design requirements;
determine from the dependency graph a subset of components of the software development project having one or more dependencies related to a first component of the software development project;
determine from attributes of the first component a code intent;
retrieve from the first database natural language text describing one or more components of the software development project having one or more dependencies related to the first component that have been used to generate computer code stored in the second database using the artificial intelligence code generator;
retrieve from the second database computer code corresponding to the retrieved natural language text describing the one or more components of the software development project having one or more dependencies related to the first component;
identify from the computer code retrieved from the second database characteristics of objects within the computer code;
using a pre-trained language model, generate for the first component a natural language summary text based on the code intent of the first component, the identified characteristics of the objects, and the natural language text retrieved from in first database;
provide the natural language summary text for the first component to the artificial intelligence code generator; and
the artificial intelligence code generator generating computer code for the first component based on the provided natural language summary.

11. The system of claim 10, wherein the instructions further cause the one or more computers to execute the step of:
before determining the subset of components of the software development project having one or more dependencies related to the first component, receiving information describing the first component of the plurality of components of the software development project, wherein the attributes of the first component are determined from the received information.

12. The system of claim 11, wherein the received information is a title of the first component.

13. The system according to claim 10, wherein the instructions further cause the one or more computers to execute the step of:
storing the computer code for the first component in the second database and the natural language summary text for the first component in the first database.

14. The system according to claim 10, wherein the design requirements of the software development project comprise any one or more of: high level design requirements, system architecture, project management path, and change request proposals.

15. A non-transitory computer-readable medium storing software comprising instructions executable by one or more computers which, upon such execution, cause the one or more computers to:
receive design requirements of the software development project;
generate a dependency graph of components of the software development project based on the design requirements;
determine from the dependency graph a subset of components of the software development project having one or more dependencies related to a first component of the software development project;
determine from attributes of the first component a code intent;
retrieve from a first database storing natural language text describing components of the software development project used with an artificial intelligence code generator, natural language text describing one or more components of the software development project having one or more dependencies related to the first component that have been used to generate computer code stored in the second database using the artificial intelligence code generator;

retrieve from a second database storing computer code generated at least partially by the artificial intelligence code generator and defining components of the software development project and corresponding to the natural language text stored in the first database, computer code corresponding to the retrieved natural language text describing the one or more components of the software development project having one or more dependencies related to the first component;

identify from the computer code retrieved from the second database characteristics of objects within the computer code;

using a pre-trained language model, generate for the first component a natural language summary text based on the code intent of the first component, the identified characteristics of the objects, and the natural language text retrieved from the first database;

provide the natural language summary text for the first component to the artificial intelligence code generator; and generate computer code for the first component using the artificial intelligence code generator, based on the provided natural language summary.

16. The non-transitory computer-readable medium storing software of claim 15, wherein the instructions further cause the one or more computers to:

before determining the subset of components of the software development project having one or more dependencies related to the first component, receive information describing the first component of the plurality of components of the software development project, wherein the attributes of the first component are determined from the received information.

17. The non-transitory computer-readable medium storing software of claim 16, wherein the information describing the first component of the plurality of components is received from a graphical user interface, GUI.

18. The non-transitory computer-readable medium storing software of claim 16, wherein the received information is a title of the first component.

19. The non-transitory computer-readable medium storing software of claim 15, wherein the instructions further cause the one or more computers to:

store the computer code for the first component in the second database and the natural language summary text for the first component in the first database.

20. The non-transitory computer-readable medium storing software of claim 15, wherein the step of generating for the first component a natural language summary text based on the code intent of the first component further comprises iteratively aligning a rough natural language summary text with the characteristics of objects within the computer code by measuring a similarity between words in the rough natural language summary text and corresponding computer code until the measure of similarity is increased.

* * * * *